United States Patent
Ruttor

(10) Patent No.: US 6,786,112 B2
(45) Date of Patent: Sep. 7, 2004

(54) HARMONIC DRIVE WITH CROWNED DRIVE RING

(75) Inventor: Martin Ruttor, Wohnsitz (DE)

(73) Assignee: Oechsler AG, Ansbach (DE)

( * ) Notice: Subject to any disclaimer, the term of this patent is extended or adjusted under 35 U.S.C. 154(b) by 1 day.

(21) Appl. No.: 10/257,223

(22) PCT Filed: Jan. 22, 2002

(86) PCT No.: PCT/EP02/00580
§ 371 (c)(1),
(2), (4) Date: Oct. 8, 2002

(87) PCT Pub. No.: WO02/063187
PCT Pub. Date: Aug. 15, 2002

(65) Prior Publication Data
US 2003/0075009 A1 Apr. 24, 2003

(30) Foreign Application Priority Data
Feb. 8, 2001 (DE) .......................................... 101 05 814

(51) Int. Cl.[7] .............................. F16H 1/32; F16H 49/00
(52) U.S. Cl. ....................................................... 74/640
(58) Field of Search ............................... 74/640, 606 R

(56) References Cited
FOREIGN PATENT DOCUMENTS

| DE | 2545681 | 4/1977 |
|----|---------|--------|
| DE | 29614738 | 10/1996 |
| JP | 60184750 | 9/1985 |
| JP | 62200056 | 9/1987 |

OTHER PUBLICATIONS

Hirn H: "Untersetzungsgetriebe Aus Kunststoff Mit Nur Zwei Bewegten Teilen. Genial Einfach", Kem. Konstruktion, Elektronik, Maschinenbau, Konradin Verlag Kohlhammer, De, pp. 94–95 XP 000645907, ISSN:0934–0270.

*Primary Examiner*—Charles A. Marmor
*Assistant Examiner*—Dennis J. Abdelnour
(74) *Attorney, Agent, or Firm*—Horst M. Kasper

(57) ABSTRACT

A shaft drive (10), which may be produced without problem and easily—even in a cascade—assembled, may be achieved, whereby the support ring (18) produced such as to be floating relative to the housing is rotationally fixed on the front side to a housing base plate (12) and enclosed by a housing cover (20), similarly fixed to the base plate (12), in which the drive shaft (25) for the crowned drive ring (27), which may rotate relative to the support ring (18), has a floating bearing. The inner wheel (28), extending through both rings is however not supported in the housing, but rather mounted on the drive shaft (14) extending coaxially into the housing (11) through the base plate (12), by means of the wave generator drive core (30), the base plate (12) being non-rotationally mounted in front of the bearing plate (32) of the above.

11 Claims, 2 Drawing Sheets

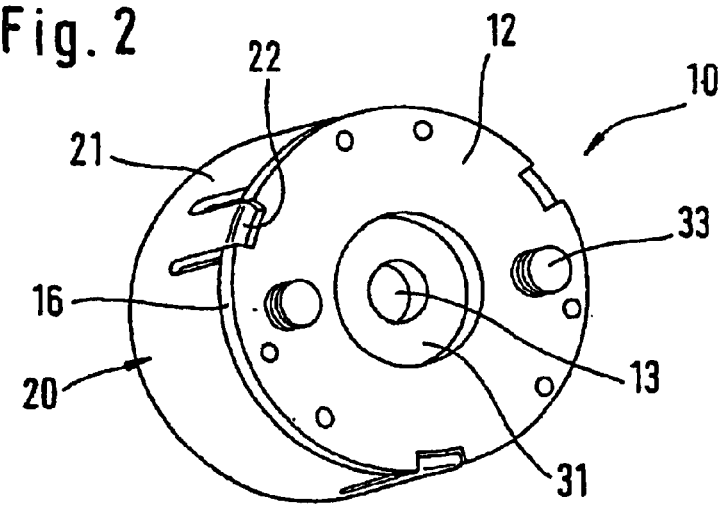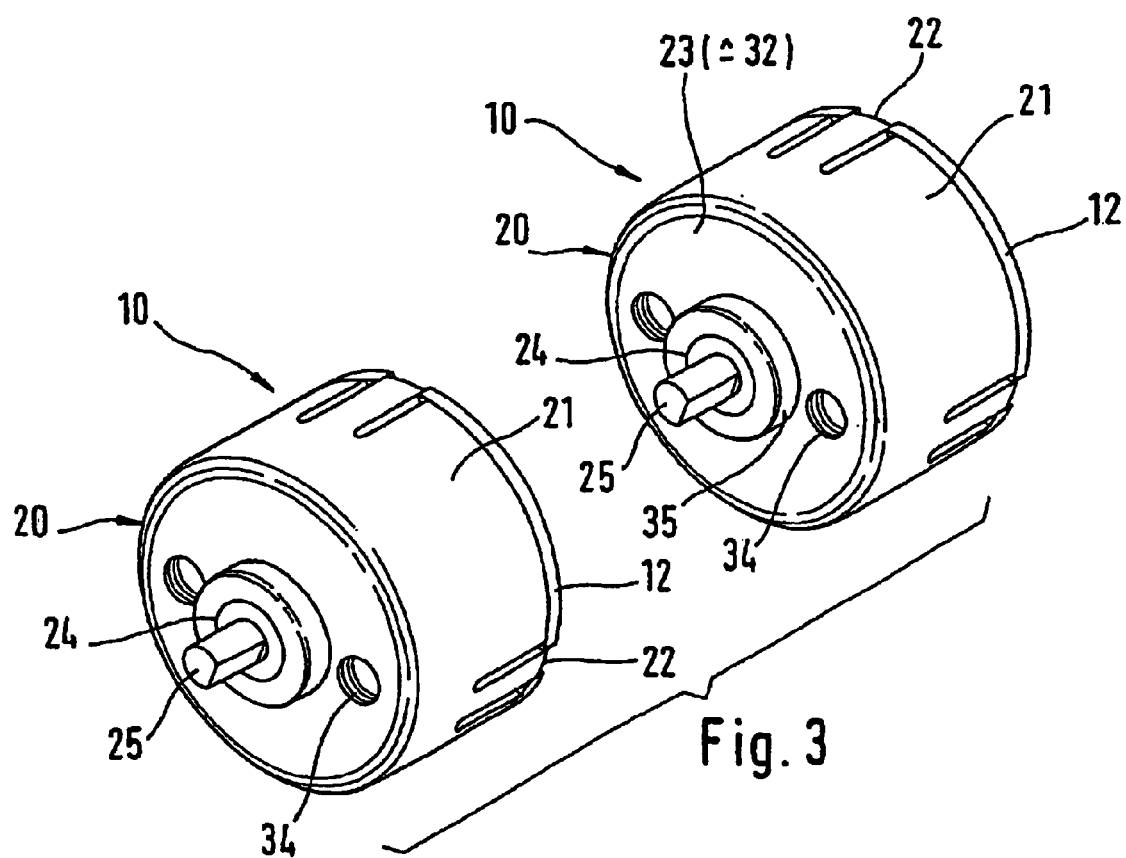

HARMONIC DRIVE WITH CROWNED DRIVE RING

TITLE OF THE INVENTION

CROSS-REFERENCE TO RELATED APPLICATIONS (not applicable)

Figure 1:
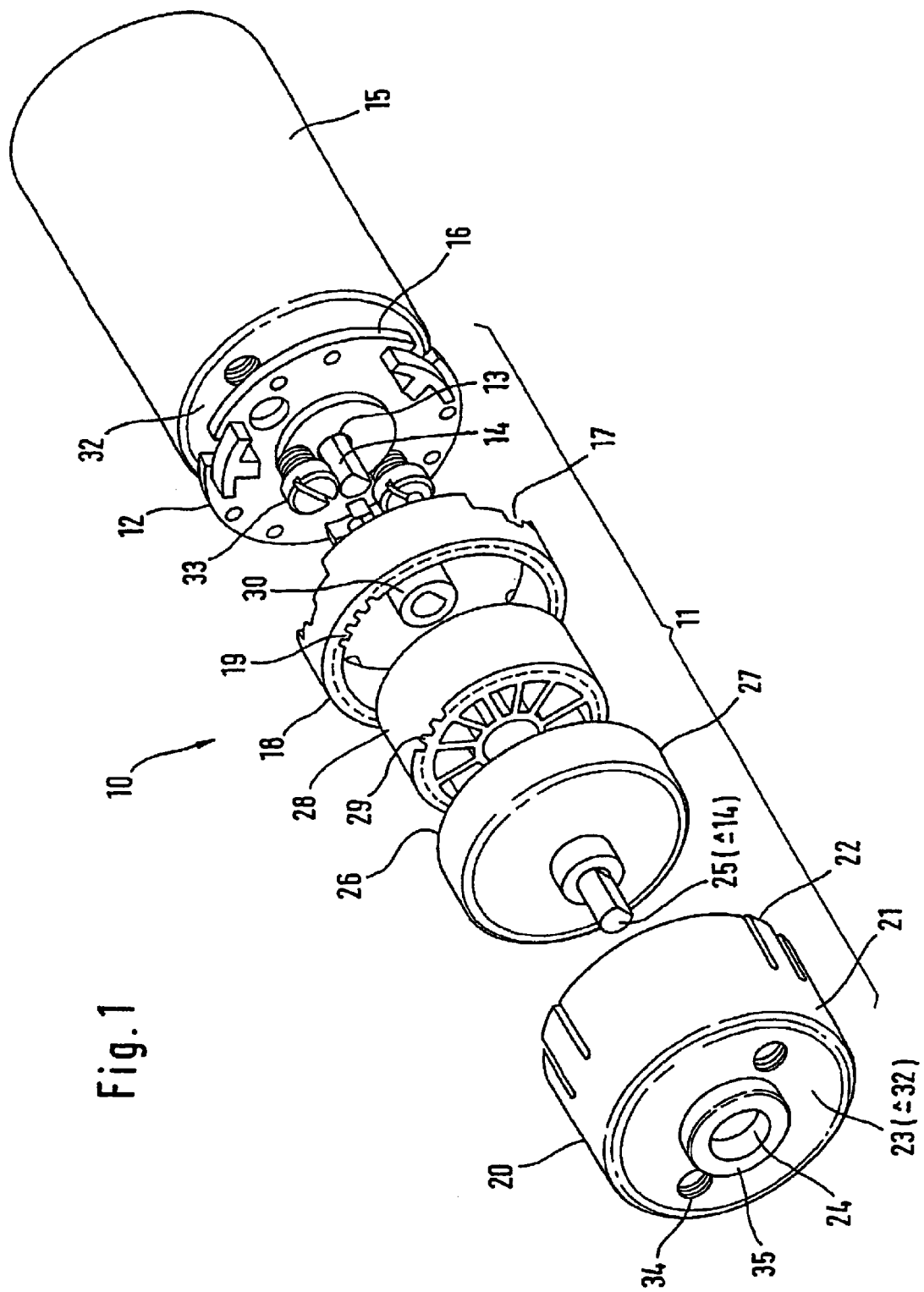

STATEMENT REGARDING FEDERALLY SPONSORED RESEARCH OR DEVELOPMENT (not applicable)

INCORPORATION-BY-REFERENCE OF MATERIAL SUBMITTED ON A COMPACT DISC (See 37 CFR 1.52(e)(5) and MPEP 608.05. Computer program listing (37 CFR 1.96(c)), "Sequence Listings" (37 CFR 1.821(c), and tables having more than 50 pages of text are permitted to be submitted on compact discs.) or REFERENCE TO A "MICROFICHE APPENDIX" (See MPEP §608.05(a). "Microfiche Appendices" were accepted by the Office until Mar. 1, 2001.)

(not applicable)

BACKGROUND OF THE INVENTION (not applicable)

FIELD OF THE INVENTION (not applicable)

The present invention relates to a harmonic drive according to the preamble of the main claim.

The functionality of such a harmonic drive—also known as a wave drive or ring band drive—as a very strongly reducing, self-limiting system having a driven shaft coaxial to the drive shaft, is based on a rotating wave generator revolvingly radially deforming an internal geared wheel hoop, also referred to as a flexible band, and therefore its external peripheral surface revolvingly pressing locally outward against the hollow cylindrical internal peripheral surface of slightly greater circumference of a stationary internal gear used as a dimensionally stable support ring which is fixed to the housing. As a consequence, the internal geared wheel itself or its wheel hoop, mounted thereon as a rotatable wheel rim, rolls in the support ring frictionally via friction surfaces or positively via teeth, the wheel and/or its hoop rotating slower than the drive core of the wave generator, which is driven by a motor, according to the difference in circumferences. This rotational movement, which is greatly slowed in relation to the actuation, is preferably transmitted via the external teeth of the wheel rim to the internal teeth of a further external ring, the driven ring, which is concentric to the support ring but not stationary, rather, in contrast, coaxially rotatable, and which is designed in a cup or cap shape, for example, and which is equipped with a driven shaft mounted in the drive housing. A further reduction of the rotational velocity may occur in the teeth from the internal geared wheel to the driven ring due to differing circumferences (number of teeth). The wave generator is typically driven via a low voltage DC motor, coaxially flanged on, which is high-speed and therefore available very cheaply, whose rapid rotation is thus reduced into a much greater torque corresponding to a much slower rotational movement, which has many applications, such as an actuator for motor and climate management and for other functions in a motor vehicle, particularly those replacing manual interventions.

(1) Description of Related Art Including Information Disclosed Under 37 CFR 1.97 and 1.98.

In the embodiments of such a harmonic drive known from German Utility Model 2 96 14 738, which thus forms the species, and described in more detail in the article "Genial einfach" by H. Hirn (KEM Antriebstechnik issue 10/1996), a non-round (for example triangular or preferably oval in axial cross-section) drive core is rotated concentrically in the hub of a radially deformable internal geared wheel as a wave generator. This internal geared wheel may be a one-piece injection molded part having spoke-like, radially oriented tappets between the radially deformable internal geared wheel hub and the externally toothed internal geared wheel hoop, which is also radially deformable. Spokes, which are dimensionally stable lengthwise, between the hub, which is radially deformed by the drive core, and the hoop have the effect that the external teeth of the hoop, corresponding to its revolving radial deformation, only engage over a limited curved segment, which moves around the circumference, with the inner teeth of the support ring.

The present invention is based on the technical problem of indicating a compact construction for such a harmonic drive, already proven in practical use, which is nonetheless easy to mount and usable in many ways.

BRIEF SUMMARY OF THE INVENTION

According to the combination of features of the main claim, the object is essentially achieved in that, for a harmonic drive which is not problematic to manufacture precisely, the internal teeth of the support ring are no longer an integral component of the drive housing, but rather are mounted on a housing baseplate after separate manufacturing and then overlapped by a housing cup, to be attached separately next to it. In this way, exact concentric running of the toothed components to one another may be ensured. The cup receives the central drive shaft of the cap-shaped drive ring in a cantilever mounting, while the baseplate does not fulfill any direct bearing functions for rotating drive parts. On the other hand, reaction forces of the drive are only absorbed by this baseplate; it may therefore not impair the bearing function of the other housing part, which additionally has a radially centering and axially guiding effect due to its fixing on the baseplate. The outside of the baseplate may have different geometric layouts for mounting on different available drive motors.

The internal geared wheel is therefore centered not directly via the baseplate, but rather using the drive shaft which projects through the baseplate. Their indirect engagement in the sleeve-shaped drive core also provides the advantage of dispensing with mounting in the drive housing at the driving end, because this bearing function is assumed outside the drive at the driving end. This allows direct mounting in front of the drive without interposing a coupling element and therefore produces an axially short construction of a very strongly reducing drive motor.

BRIEF DESCRIPTION OF THE SEVERAL VIEWS OF THE DRAWING(S)

Reference is made to the further claims and to the following description of a preferred exemplary embodiment of the achievement of the object according to the present invention in regard to further advantages and particular embodiments and refinements and their advantages. In the drawing, which is restricted to the elements essential to the construction and is approximately to scale, FIG. 1 shows the construction of the harmonic drive with the housing still unmounted in an exploded view, FIG. 2 shows the completely assembled harmonic drive in a view toward the baseplate of its housing, and FIG. 3 shows two harmonic drives of this type in a cascadable arrangement.

DETAILED DESCRIPTION OF THE INVENTION

Harmonic drive 10, sketched in FIG. 1 of the drawing in an exploded view, manufactured completely from injection molded plastic parts, and implemented according to the present invention, has a housing 11 with a baseplate 12 in the form of a circular disk. A central through hole 13 is used for engaging drive shaft 14 of a drive motor 15 in drive 10. The diameter of hole 13 is, however, greater than that of shaft 14, so that no radial bearing function occurs in this case.

Baseplate 12 is equipped in its edge region 16 with profiles such as notches and/or holes for positive engagement with complementary profiles in face region 17 of a support ring 18, to be positioned fixed to the housing, having dimensionally stable internal teeth 19. Therefore, support ring 18 may be, independently from a housing cup 20 to be overlapped later with radial play, fixed on its face using form fit or friction—for example through crimping or soldering and/or gluing—concentrically to through hole 13 and rotationally fixed on baseplate 12. Support ring 18 is then axially and radially overlapped by cap-shaped cup 20, having drive ring 27 inserted, which is also mounted on its face on baseplate 12. Wall 21 of cup 20 is equipped around the circumference with several spring hooks 22, parallel to the axis, for engaging with edge region 16 and baseplate 12 (cf. FIG. 2), like those sketched, in the form of flexible springs cut free in the form of clips having angled free front ends for engaging behind profiled edge region 16. Support ring 18 mounted separately on baseplate 12 in this way provides the particular advantage over a support ring integrated in the hollow cylindrical inner wall of cup 20, as already described above, of its inner teeth 19 being able to be produced more precisely circularly and therefore being able to achieve a low loss, and therefore also particularly low noise, drive operation.

Opposing bottom 23 of cup 20 represents the free face of housing 11, and therefore also drive 10, and contains the single bearing of this drive 10. For this purpose, cup bottom 23 is equipped with a socket-shaped reinforcement as an end plate for implementing a radial mounting 24 for a drive driven shaft 25 projecting coaxially to motor drive shaft 14. This bottom is connected so it is rotationally fixed to a driven ring 27, which is also cup-shaped or cap-shapedand is provided with dimensionally stable internal teeth 26. Its average diameter is approximately equal to that of support ring 18, which is fixed to the housing and placed axially in front of it in relation to baseplate 12, so that driven ring 27 is axially guided between it and the internal surface of bottom 23 in cup 20. The radial mounting of driven ring 27 is performed in housing bearing 24 using its driven shaft 25, which is anchored in the cup bottom or implemented in one piece with it, and, if necessary, additionally in relation to the hollow cylindrical internal lateral surface of cup or housing wall 21.

A radially deformable internal geared wheel 28 having external teeth 29 is positioned between both rings 18–27, which are mounted coaxially and neighboring one another axially, having slightly different numbers of teeth according to their slightly different internal circumferences. The internal geared wheel is axially longer than both neighboring, dimensionally stable rings 18, 27 individually and therefore engages simultaneously with both of their internal teeth 19, 26 via the straight, radially bulged curved piece. Preferably, internal geared wheel 28 is as long as both rings 18–27 together and is therefore axially guided between baseplate 12 and the cap bottom of driven ring 27. For the rotation of the curved part of internal geared wheel 28, which engages due to radial deformation, its hollow hub, which is also radially deformable, radially accommodates a drive core 30 without play, which is non-round in cross-section, preferably oval, and which is set into rotational movement from outside drive 10 by a motor.

Internal geared wheel 28 and its central drive core 30 are not mounted in housing 11 of drive 10 and are therefore not centered in rings 18, 27 having larger internal diameters. The radial alignment is performed, however, in that baseplate 12 is mounted centered in relation to drive shaft 14, which projects through it and into drive core 30, in that shaft 14 therefore engages in drive core 30 when baseplate 12 is coaxially mounted on its end plate 32. In this case, end plate 32 therefore represents the end terminus of the housing of drive motor 15. The engagement of drive shaft 14 in drive core 30 may be frictional; for easy plug-in mounting and, nonetheless, reliable, non-slip torque transmission, however, a form fit is preferred, such as one as a consequence of a partially flattened cross-section of shaft 14, as may be seen in shafts 25/14 in FIG. 3.

To promote centered mounting, baseplate 12 may have a coaxial groove 31 (see FIG. 2) on the outside, i.e., in its free face, in which socket 35, which is shaped like a flat hollow truncated cone, on end plate 32 for drive shaft 14 (particularly of drive motor 15), engages axially. The mounting itself is expediently performed using molded-on or separate fastening elements such as short clamping screws 33, which are pushed through baseplate 12 parallel to the axis on the drive side and screwed into threaded holes 34 in end plate 32. If it has not yet been done, support ring 18 may now be mounted on baseplate 12. The free front end of drive shaft 14 projecting through baseplate 12 is equipped with drive core 30, and the drive core is equipped with internal geared wheel 28, after which cap-shaped driven ring 27 is pushed over the part of internal geared wheel 28 axially projecting out of support ring 18 and finally cup 20 is pushed over driven ring 27 until it engages with baseplate 12. Driven shaft 25 of drive 10 then projects through housing mounting 24, whereupon harmonic drive 10 is assembled and ready for use.

Expediently, bottom 23, which is used as an end plate on the drive side, of housing cup 20, like the end plate of drive motor 15, is equipped with attachment means such as threaded holes 34 for clamping screws 33. Then, such a harmonic drive 10 having its baseplate groove 31 may also be mounted in front of another harmonic drive 10 of this type, instead of in front of a drive motor 15, using its centering projecting bearing socket 35, and the drive reduction may be cascaded in this way, as indicated in FIG. 3. Now, only the free shaft projecting out of frontmost cup bottom 23 of frontmost drive 10 is used as a driven shaft 25, while the others are all used as drive shafts 14. A harmonic drive 10 of such a cascade is therefore mounted with its baseplate 12 in front of cup bottom 23 of preceding harmonic drive 10, whose bottom 23 therefore acts as an end plate 32 for drive shaft 14, which centers internal geared wheel 28 in housing 11 of the following drive stage.

In a refinement of the present invention, end plates 32 of drive motor 15 or of drives 10 to be cascaded may themselves be implemented directly as the baseplates for the housing of adjoining harmonic drive 10, due to which separate mounting via clamping screws 33 or similar attachment elements may be dispensed with.

Therefore, a harmonic drive 10 which is not problematic to manufacture and is easy to mount—even cascaded— results according to the present invention, in that support ring 18, manufactured separately from housing 11, is mounted on the face, rotationally fixed on a housing baseplate 12, and overlapped by a housing cup 20, also to be attached to baseplate 12, in whose bottom 23 driven shaft 25 of cap-shaped driven ring 27, rotatable in relation to support ring 18, is in a cantilever mounting. Radially deformable internal geared wheel 28, which extends axially with radial play through both radially dimensionally stable rings 18–27, is not, in contrast, mounted in housing 11 itself, but rather via its wave generator drive core 30 on drive shaft 14, which projects through baseplate 12 coaxially into housing 11, with radial play, in front of whose end plate 32 baseplate 12 is mounted rotationally fixed.

What is claimed is:

1. A harmonic drive (10) having a housing and a housing baseplate (12) with a central hole and having a generator drive core (30) in a revolvingly radially deformable internal geared wheel (28), which extends axially through a dimensionally stable support ring (18), which is fixed to the housing, into a cap-shaped, dimensionally stable driven ring (27) mounted using its driven shaft (25) in the housing (11), wherein the dimensionally stable support ring (18) is of somewhat greater internal diameter than a non-deformed internal geared wheel external diameter, and wherein the cap-shaped dimensionally stable driven ring (27) is of somewhat greater internal diameter than the non-deformed internal geared wheel external diameter, characterized in that a housing independent support ring is mounted on its face on the housing baseplate (12) and is overlapped by a housing cup (20), whose bottom (23) is equipped with a bearing (24) for the driven shaft (25) and whose front edge, opposite the bottom (23) is rigidly connected to the housing baseplate (12), wherein the housing baseplate (12) is equipped with a profiled edge region (16) for form-fitting accommodation of the support ring (18) and of the housing cup (20).

2. The harmonic drive according to one of claim 1, characterized in that the cap-shaped driven ring (27) is mounted in the housing cup (20) of the housing (11), against the internal geared wheel (20) including its drive core (30), on the drive shaft (14), which projects here unmounted through the housing baseplate (12) into the housing (11), on its end plate (32).

3. The harmonic drive according to one of claim 1, characterized in that the housing baseplate (12) is equipped on its free face with a coaxial groove (31) for centering engagement of a bearing socket (35) for the drive shaft (14).

4. The harmonic drive according to claim 1, characterized in that a driving end plate (32) is equipped with fastening means for the housing baseplate (12).

5. The harmonic drive according to claim 4, characterized in that the housing baseplate (12) is fastened in front of the driving end plate (32) using short clamping screws (33) parallel to the axis.

6. The harmonic drive according to claim 1, characterized in that an end plate (32) for a drive shaft (14) is equipped with threaded holes (34) to engage with clamping screws (33) to accommodate the housing baseplate (12).

7. The harmonic drive according to claim 1, characterized in that the bottom (23) of a drive housing cup (20) is used as an end plate (32) for the internal geared wheel (28) in a drive (10) positioned before it, whose housing baseplate (12) is mounted in front of its bottom (23).

8. The harmonic drive according to claim 1, characterized in that a driving end plate simultaneously assumes the function of the housing baseplate of a drive stage which follows it.

9. A harmonic drive (10) comprising
a housing (11);
a cap-shaped, dimensionally stable driven ring (27) mounted in the housing (11) and using a driven shaft (25);
a dimensionally stable support ring (18) disposed fixed to the housing (11);
a revolvingly radially deformable internal geared wheel (28) extending axially through the dimensionally stable support ring (18), wherein the dimensionally stable support ring (18) is of somewhat greater internal diameter than a non-deformed internal geared wheel external diameter;
a cap-shaped, dimensionally stable driven ring (27) mounted using its driven shaft (25) in the housing (11) and wherein the cap-shaped dimensionally stable driven ring (27) is of somewhat greater internal diameter than the non-deformed internal geared wheel external diameter;
a housing baseplate (12) having a central hole and having a generator drive core (30) disposed in the revolvingly radially deformable internal geared wheel (28), which revolvingly radially deformable internal geared wheel (28) extends axially into the cap-shaped, dimensionally stable driven ring (27);
a support ring independent of the housing (11) and having a front face is mounted with the front face on the housing baseplate (12);
a bearing (24) for the driven shaft (25);
a housing cup (20) having a bottom (23) equipped with the bearing (24) for the driven shaft (25) and having a front edge disposed opposite to the bottom (23) and rigidly connected to the housing baseplate (12), wherein the housing cup (20) overlaps the radially dimensionally stable support ring (18).

10. The harmonic drive according to claim 9, wherein the housing baseplate (12) is equipped with a profiled edge region (16) for form-fitting accommodation of the support ring (18) and of the housing cup (20).

11. The harmonic drive according claim 10, characterized in that the hollow-cylindrical wall (21) of the housing cup (20) is equipped with spring hooks (22) for engaging behind the housing baseplate (12).

* * * * *